United States Patent
Abhishek Raja et al.

(10) Patent No.: US 12,405,898 B1
(45) Date of Patent: Sep. 2, 2025

(54) MEMORY SYNCHRONISATION SUBSEQUENT TO A PAGE TABLE WALK

(71) Applicant: Arm Limited, Cambridge (GB)

(72) Inventors: . Abhishek Raja, Niagara Falls, NY (US); Alexander Donald Charles Chadwick, Cambridge (GB); Andrew Brookfield Swaine, Sheffield (GB); Timothy Hayes, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/586,674

(22) Filed: Feb. 26, 2024

(51) Int. Cl.
*G06F 12/00* (2006.01)
*G06F 11/20* (2006.01)
*G06F 12/1009* (2016.01)
*G06F 12/1045* (2016.01)

(52) U.S. Cl.
CPC ...... *G06F 12/1009* (2013.01); *G06F 11/2082* (2013.01); *G06F 12/1045* (2013.01)

(58) Field of Classification Search
CPC ............ G06F 12/1009; G06F 11/2082; G06F 12/1045
See application file for complete search history.

(56) References Cited

U.S. PATENT DOCUMENTS

| | | | | |
|---|---|---|---|---|
| 9,531,647 B1* | 12/2016 | Goyal | ................... | H04L 49/90 |
| 11,748,267 B1* | 9/2023 | Williams | ............ | G06F 12/0891 |
| | | | | 711/135 |
| 12,045,615 B1* | 7/2024 | Duggal | ............... | G06F 9/38585 |
| 2004/0215898 A1* | 10/2004 | Arimilli | .............. | G06F 12/1072 |
| | | | | 711/E12.066 |
| 2016/0140040 A1* | 5/2016 | Mukherjee | .......... | G06F 12/1027 |
| | | | | 711/135 |
| 2019/0042253 A1* | 2/2019 | Eyole | .................. | G06F 9/30076 |
| 2020/0065260 A1* | 2/2020 | Ghoshal | ............. | G06F 12/1027 |

\* cited by examiner

*Primary Examiner* — Arvind Talukdar
(74) *Attorney, Agent, or Firm* — NIXON & VANDERHYE P.C.

(57) ABSTRACT

There is provided an apparatus, a method, and a computer readable storage medium. The apparatus comprises memory translation circuitry responsive to receipt of a translation request specifying a first address, to perform a page table walk process to identify a corresponding second address. The apparatus is also provided with control circuitry responsive to receipt of a memory synchronisation occurring subsequent to at least one maintenance operation, to implement a delay before performing the memory synchronisation. The delay continues whilst one or more pending memory accesses affected by the maintenance operation are outstanding. The control circuitry is configured to perform a filtering process to identify candidate page table walk processes affected by the maintenance operation and, for each candidate page table walk, to cancel the candidate page table walk process and to issue a replayed translation request to trigger a replay of the candidate page table walk process.

20 Claims, 8 Drawing Sheets

MEMORY SYNCHRONISATION SUBSEQUENT TO A PAGE TABLE WALK

TECHNICAL FIELD

The present invention relates to an apparatus, a system, a chip containing product, a method, and a non-transitory computer readable storage medium for data processing.

BACKGROUND

Some apparatuses are provided with memory synchronisation instructions, which may act as a barrier instruction to prevent subsequent instructions executing prior to completion of one or more maintenance operations that are pending at a time of execution of the memory synchronisation operation. A memory synchronisation operation may therefore be a source of latency.

SUMMARY

According to a first aspect of the present techniques there is provided an apparatus comprising:
  memory translation circuitry responsive to receipt of a translation request specifying a first address in a first address space, to perform a page table walk process to identify a corresponding second address in a second address space; and
  control circuitry responsive to receipt of a memory synchronisation occurring subsequent to at least one maintenance operation, to implement a delay before performing the memory synchronisation, the delay continuing whilst one or more pending memory accesses affected by the maintenance operation are outstanding,
  wherein the control circuitry is configured:
  to perform a filtering process to identify candidate page table walk processes affected by the at least one maintenance operation; and
  for each candidate page table walk of the candidate page table walk processes, to cancel the candidate page table walk process and, subsequent to the memory synchronisation, to issue a replayed translation request to trigger a replay of the candidate page table walk process.

According to a second aspect of the present techniques there is provided a system comprising:
  the apparatus according to the first aspect, implemented in at least one packaged chip;
  at least one system component; and
  a board,
  wherein the at least one packaged chip and the at least one system component are assembled on the board.

According to a third aspect of the present techniques there is provided a chip-containing product comprising the system of the second aspect, wherein the system is assembled on a further board with at least one other product component.

According to a fourth aspect of the present techniques there is provided a method comprising:
  performing in response to receipt of a translation request specifying a first address in a first address space, a page table walk process to identify a corresponding second address in a second address space; and
  implementing, in response to receipt of a memory synchronisation occurring subsequent to at least one maintenance operation, a delay before performing the memory synchronisation, the delay continuing whilst one or more pending memory accesses affected by the maintenance operation are outstanding,
  performing a filtering process to identify candidate page table walk processes affected by the at least one maintenance operation; and
  for each candidate page table walk of the candidate page table walk processes, cancelling the candidate page table walk process and, subsequent to the memory synchronisation, issuing a replayed translation request to trigger a replay of the candidate page table walk process.

According to a further aspect of the present techniques there is provided a non-transitory computer-readable medium storing computer-readable code for fabrication of an apparatus comprising:
  memory translation circuitry responsive to receipt of a translation request specifying a first address in a first address space, to perform a page table walk process to identify a corresponding second address in a second address space; and
  control circuitry responsive to receipt of a memory synchronisation occurring subsequent to at least one maintenance operation, to implement a delay before performing the memory synchronisation, the delay continuing whilst one or more pending memory accesses affected by the maintenance operation are outstanding,
  wherein the control circuitry is configured:
  to perform a filtering process to identify candidate page table walk processes affected by the at least one maintenance operation; and
  for each candidate page table walk of the candidate page table walk processes, to cancel the candidate page table walk process and, subsequent to the memory synchronisation, to issue a replayed translation request to trigger a replay of the candidate page table walk process.

BRIEF DESCRIPTION OF THE DRAWINGS

The present invention will be described further, by way of example only, with reference to configurations thereof as illustrated in the accompanying drawings, in which.

DESCRIPTION OF EXAMPLE CONFIGURATIONS

Figure 1:
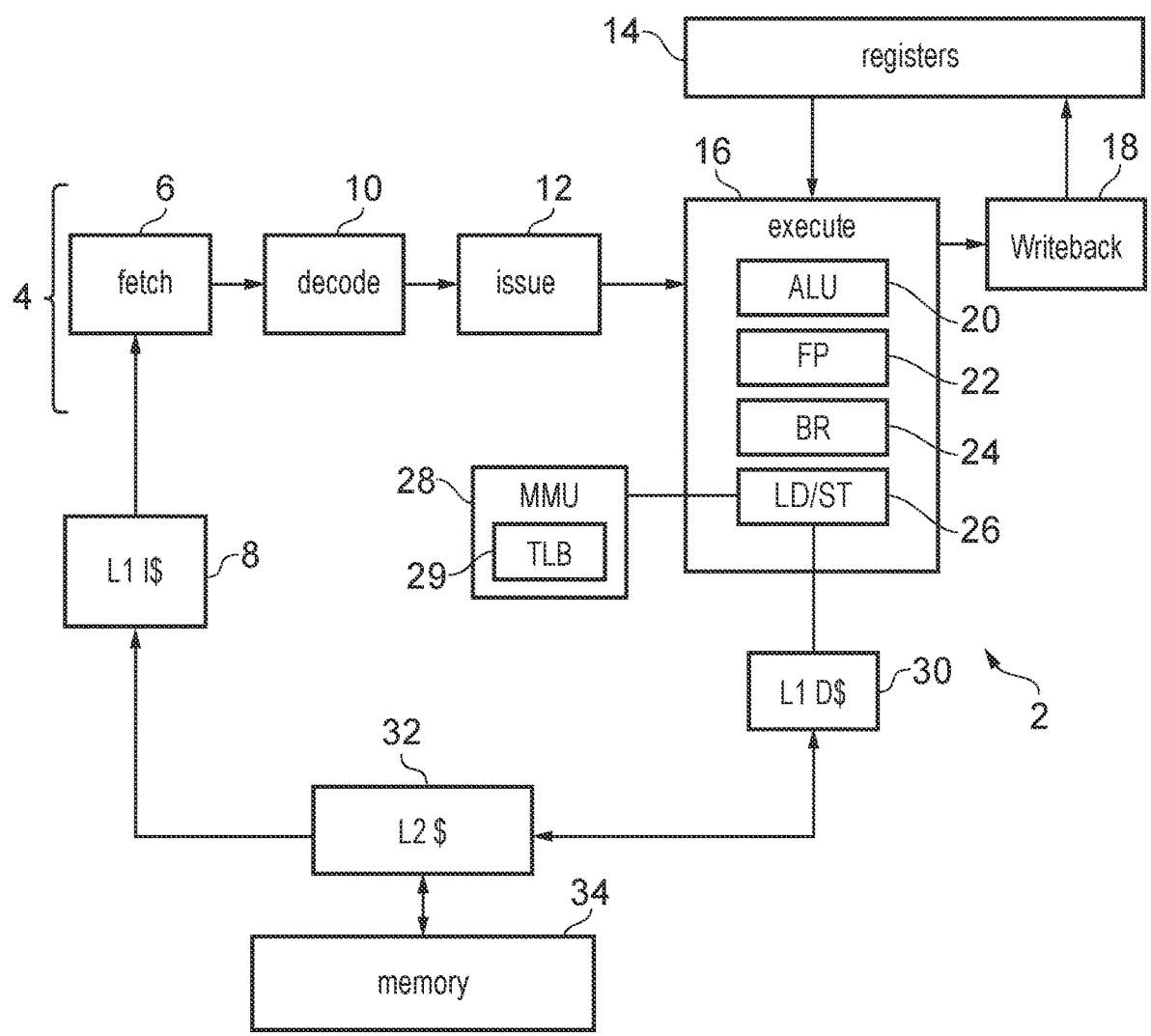
FIG. 1 schematically illustrates an apparatus according to some example configurations of the present techniques.

Before discussing the configurations with reference to the accompanying figures, the following description of configurations is provided.

In some example configurations there is provided an apparatus comprising memory translation circuitry responsive to receipt of a translation request specifying a first address in a first address space, to perform a page table walk process to identify a corresponding second address in a second address space. The apparatus is also provided with control circuitry responsive to receipt of a memory synchronisation occurring subsequent to at least one maintenance operation, to implement a delay before performing the memory synchronisation, the delay continuing whilst one or more pending memory accesses affected by the maintenance operation are outstanding. The control circuitry is configured to perform a filtering process to identify candidate page table walk processes affected by the at least one maintenance operation. The control circuitry is configured, for each candidate page table walk of the candidate page table walk processes, to cancel the candidate page table walk process and, subsequent to the memory synchronisation, to issue a replayed translation request to trigger a replay of the candidate page table walk process.

Some apparatuses (e.g., data processing apparatuses) implement plural memory address spaces, for example, a first address space that may be visible to software executing on processing circuitry of the apparatus, and a second address space that may be visible to a memory system or a hypervisor running on the apparatus. As a result, a memory access operation, e.g., a read request or a write request, specifying a first address in the first address space requires that the first address may be translated into a corresponding second address in the second address space. This can be performed using a page table walk process that maps the first address to the second address through sequential accesses to page tables in memory. Page table walk processes make plural accesses to the memory system and can therefore introduce latency.

The apparatus is also responsive to a memory synchronisation operation, which requires that all memory accesses occurring prior to the memory synchronisation that may be affected by a maintenance operation are complete before processing continues. Where the maintenance operation affects a page table walk, the memory synchronisation operation may result in processing stalling until all memory accesses associated with the page table walk have completed resulting in a high latency. The inventors have recognised that there may be situations in which an overall performance benefit can be obtained if, rather than waiting for the outstanding page table walk process to complete, page table walk processes that are affected by the maintenance operations are cancelled and replayed subsequent to the memory synchronisation. The apparatus is provided with control circuitry that performs a filtering process to identify candidate page tables walks that are affected by the at least one maintenance operation and to filter out those page table walks that are not affected by the at least one maintenance operation. It is recognised that page table walk processes that are not affected by maintenance operations preceding the memory synchronisation instruction will not cause the memory synchronisation to be delayed. Hence, these page table walk processes are allowed to continue. On the other hand, the page table walk processes that are affected by the maintenance operation are cancelled allowing the memory synchronisation to occur sooner. Cancelling page table walks may seem counter intuitive because this may result in an increased latency for the particular page table walks that have been cancelled. However, this approach allows processing to proceed sooner subsequent to the synchronisation operation and can improve overall system efficiency and reduce overall latency. The replayed page table walks may be replayed immediately after the page table walk process or may be replayed at some later stage, for example, subsequent to one or more further pending operations. The replayed page table walk can benefit from hitting on stored entries of the page table (descriptors) that were stored in the storage circuitry by the aborted walk so there are no redundant descriptor fetches.

In some configurations the apparatus comprises translation storage circuitry configured to store entries identifying translation data indicative of translations between the first address space and the second address space, the translation data corresponding to at least one stage of the page table walk process; the memory translation circuitry is responsive to receipt of the first address to perform a lookup of the first address in the translation storage circuitry, and when the lookup hits on an entry in the translation storage circuitry defining a partial translation to perform the page table walk process using the translation data identified in the entry; and the at least one maintenance operation is an invalidation operation relating to translation storage circuitry. The translation storage circuitry may be provided to cache the translation data to enable frequently accessed translations to be performed more quickly. The translation data may comprise the whole translation from the first address to the second address. Alternatively, the translation data may comprise only information relating to a partial translation, for example, a first lookup of a multi-lookup page table walk process. For example, the translation data may correspond to a first translation lookup of the page table walk process or result of a first two lookups of the page table walk process. As a result, a page table walk process can make use of the translation data stored in the translation storage circuitry to omit the having to perform the lookups defined by the partial translation, but may still require one or more lookups in page tables to be performed in order to complete the address translation from the first address to the second address.

The invalidation operation may be any type of invalidation operation. However, in some configurations the invalidation operation comprises invalidating one or more of the entries in the translation storage circuitry. Subsequent to the invalidation operation, there may be one or more outstanding page table walk processes making use of invalid data. When the memory synchronisation instruction is processed, the page table walk processes that were affected by the maintenance operation are required to either complete or be cancelled prior to the memory synchronisation operations to ensure that subsequent to the memory synchronisation, there are no outstanding memory accesses making use of old translation data.

Alternatively, or in addition, in some configurations the invalidation operation comprises marking a pending page table walk as using invalid translation data to prevent allocation into the translation storage circuitry. When the memory synchronisation instruction is processed, the page table walk processes that were affected by the maintenance operation are required to either complete or be cancelled prior to the memory synchronisation operations. The invalid translation data is not necessarily stored in the storage circuitry. For example, where the page table walk started using old data from memory and, subsequently, the descriptors were updated followed by one or more invalidation operations, translation data to be allocated from the page table walk would be invalidated to prevent allocation of stale data into the storage circuitry.

In some configurations the translation storage circuitry is a translation lookaside buffer and the maintenance operation is a translation lookaside buffer maintenance operation. The translation lookaside buffer may store the data necessary to translate between the first address space and the second address space and may further comprise partial translation data to improve the speed and reduce latency of frequently used translations.

In some configurations the translation request is associated with a requesting context of a plurality of processing contexts; the at least one maintenance operation is associated with at least one given processing context of the plurality of processing contexts; and the candidate page table walk processes comprise occurrences of the page table walk process performed in response to a corresponding translation request associated with the at least one given processing context. In the current disclosure, a "context" or a "processing context" should be understood as an operating environment in which a processing element can operate, according to which the components of the processing element are provided with a self-consistent view of not only the components of the processing element itself, but of the whole of the apparatus in which the processing element is found, for example, including one or more further components such as a memory system to which the data processing apparatus is connected. The view of the processing system is complete from the point of view of the processing context. In other words, the processing context has all the information that is required by the processing circuitry for processing operations to be performed in that processing context. However, the processing context may not include information that is not required for processing operations to be performed in that processing context. For example, the memory system with which the data processing apparatus interacts may in fact contain a wider range of address locations than the processing circuitry of the data processing apparatus is able to see when operating in a particular context, yet the processing circuitry, when operating in that particular context, has no awareness that other inaccessible memory locations in the memory system exist. Each of the plurality of processing contexts may correspond, for example, to a process that is being carried out by the apparatus. In addition to each of the plurality of processing elements being configured to perform processing in one of the plurality of contexts, each of the plurality of contexts may be processed by one or more of the plurality of processing elements either in parallel or sequentially. For example, a given processing context may initially be processed on a first processing element of the plurality of processing elements but, subsequent to one or more context switching operations, the processing context may, subsequently, be processed on a second processing element (different to the first processing element) of the plurality of processing elements.

Because a single processing context may be processed by a plurality of processing elements and a single processing element may process a plurality of processing contexts, data (for example, translation data) associated with one or more processing contexts may be retained by the processing elements once the processing element has finished processing the context with which that data was associated. During processing, a given processing context may issue one or more maintenance operations relating to the data that is associated with the set of one or more contexts. For example, in some configurations a context operating at a higher exception level may issue a maintenance operation relating to one or more contexts operating at a lower exception level. These maintenance operations may require invalidation of entries in translation storage circuitry, e.g., a Translation Lookaside Buffer (TLB), and/or invalidation of one or more page table walks. In some use cases, the maintenance operations may be followed by a request for a memory synchronisation requiring that all memory updates including all page table walks associated with the at least one given processing context have been completed before the synchronisation can be completed.

Maintaining information indicative of which processing context is associated with each of the page table walk processes, the control circuitry is able to filter the page table walk processes based on the contexts and identify those page table walks as the candidate page table walks to be cancelled and replayed subsequent to the memory synchronisation. By cancelling all page table walks associated with the at least one given processing context, the memory synchronisation can be completed sooner allowing the processing circuitry to proceed with further processing operations and reducing the overall system latency.

One example of a memory synchronisation operation is a distributed virtual memory synchronisation (DVM sync) operation. Distributed virtual memory improves parallelisation by maintaining local copies of data items. For example, a system implementing distributed virtual memory and supporting one or more virtual machines may include a virtual machine implementation that may run one or more processes or applications across multiple processing elements. For example, an application may be multi-threaded with each thread running in parallel on different processing elements, or sequentially with different threads run one after another on the same processing element. In such a situation, the operating system of the virtual machine has to manage memory, for example, by assigning and reclaiming pages and may issue maintenance operations in respect of those applications. The distributed virtual memory synchronisation is an operation that allows the operating system of the virtual machine to ensure that the application is being executed properly whilst its pages are being remapped.

In some configurations the control circuitry is responsive to at least a first encoding of the maintenance operation, to identify a single one of the plurality of processing contexts as the at least one given processing context. The specific processing context may be identified as the processing context that issued the maintenance operation. Alternatively, the processing context may be specified as a processing context other than the issuing processing context, for example, a maintenance operation may be issued by a hypervisor to trigger a maintenance operation in relation to a different processing operation.

In some configurations the at least one given processing context excludes one or more of the plurality of processing contexts. The at least one given processing context may therefore be a plurality of processing contexts specifying some but not all of the plurality of processing contexts. The processing contexts may be identified by a group identifier or by a plurality of context identifiers.

In some configurations the control circuitry is responsive to at least a second encoding of the maintenance operation, to identify all of the plurality of processing contexts as the at least one given processing context. The maintenance operation specified using the second encoding may therefore be considered to be a global maintenance operation affecting all processing contexts.

In addition, or as an alternative, to filtering the page table walk processes based on the given context, in some configurations the filtering process comprises identifying occurrences of the page table walk process issued speculatively as the candidate page table walk processes. For speculatively issued page table walks, there is a possibility that the result of the page table walk may not be required. As such, delaying the memory synchronisation until after the speculative page table walks may introduce unnecessary latency for speculative walks to perform translations that are never actually required by the apparatus. Furthermore, cancelling speculative page table walks may have a lower performance penalty than cancelling non-speculative page table walks. Hence, filtering the page table walk processes based on whether or not the page table walk processes are speculative can provide a performance increase without incurring a penalty for replaying the page table walks which may not be required.

In some configurations the filtering process comprises identifying occurrences of the page table walk process associated with a prefetch request as the candidate page table walk processes. Because prefetches are speculatively issued filtering page table walk processes to obtain candidate page table walk processes based on whether those page table walks are associated with prefetch requests may also avoid incurring a replay penalty for the page table walks.

In some configurations the control circuitry is configured to associate replay occurrence information indicative of a number of times a translation request has been replayed with the replayed translation request; and the filtering process comprises omitting page table walk processes from the candidate page table walk processes when the replay occurrence information associated with the page table walk processes exceeds a predefined threshold. The inventors have recognised that there may be some use cases in which maintenance operations followed by memory synchronisations may occur frequently resulting in the potential for some page table walks to be repeatedly cancelled and replayed. The use of replay occurrence information provides an indication of a number of replayed requests and can be used to filter page table walk processes. In this way, when the replay occurrence information indicates that a predefined threshold has been exceeded, then the filtering process may exclude one or more page table walk processes from the candidate page table walk processes ensuring that all page table walk processes will eventually be allowed to complete.

The replay occurrence information may be global replay occurrence information indicative of a total number of page table walks that have been replayed or a maximum number of times that any outstanding page table walk process has been replayed. In some configurations the control circuitry is configured to associate the replay occurrence information only with an oldest non-speculative translation request. Filtering the page table walk processes using the replay occurrence information would therefore ensure that the oldest non-speculative translation request is allowed to complete once the replay occurrence information exceeds the predefined threshold. Once the oldest non-speculative translation request has been successfully replayed, the replay occurrence information may track the next oldest non-speculative translation request.

The predefined threshold can be set to any value. However, in some configurations the predefined threshold is a single replay. As a result, the oldest request will only be replayed at most one time before it is allowed to complete. This approach provides a trade-off between ensuring that the page table walks are able to complete whilst providing a reduction in the latency associated with the memory synchronisation.

The page table walk process may be a standard single-stage page table walk process in which a single set of sequential page tables are accessed to translate the first address to the second address. In some configurations the page table walk process is a multi-stage page table walk process. The multi-stage page table walk process may involve translating the first address to an intermediate address through one or more sequential page table accesses in a first stage of the page table walk process and translating the intermediate address to the second address through one or more sequential sets of page table accesses in a second stage of the page table walk process. The number of page tables accessed in a multi-stage page table walk can become quite large and, hence, by cancelling and replaying a multi-stage page table walk, a greater reduction in latency may be achieved.

In some configurations the first address is a virtual address and the first address space is a virtual address space, and the second address is a physical address and the second address space is a physical address space or an intermediate physical address space. The memory translation circuitry may be arranged to translate between a virtual address and an intermediate physical address, and between an intermediate physical address and a physical address.

Particular configurations will now be described with reference to the figures.

FIG. 1 schematically illustrates an example of a data processing apparatus 2. The data processing apparatus has a processing pipeline 4 (an example of processing circuitry, which could for example form part of a CPU (Central Processing Unit)). The processing circuitry 4 is for executing instructions defined in an instruction set architecture (ISA) to carry out data processing operations represented by the instructions. The processing pipeline 4 includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example, in an out-of-order processor a register renaming stage could be included for mapping architectural registers specified by program instructions or micro-operations to physical register specifiers identifying physical registers in the register file 14. In some examples, there may be a one-to-one relationship between program instructions defined in the ISA that are decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 26 for performing load/store operations to access data in a memory system 8, 30, 32, 34.

A memory management unit (MMU) 28 is provided for controlling memory access permission checks and performing address translations between virtual addresses specified by the load/store unit 26 based on operands of data access instructions and physical addresses identifying storage locations of data in the memory system. The MMU has a translation lookaside buffer (TLB) 29 for caching address translation data from page tables stored in the memory system, where the page table entries of the page tables define the address translation mappings and may also specify access permissions which govern whether a given process executing on the pipeline is allowed to read, write or execute instructions from a given memory region. While the MMU 28 is shown as associated with the load/store unit 26, the MMU 28 may also be looked up on instruction fetches triggered by the fetch stage 6 (or a separate instruction-side MMU may be implemented to handle instruction fetches, separate from the data-side MMU used by the load/store unit 26 for data accesses—in this case both MMUs can cache in their TLBs 29 information from a shared set of page tables).

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline implementation, and the processor may include many other elements not illustrated for conciseness.

Figure 2:
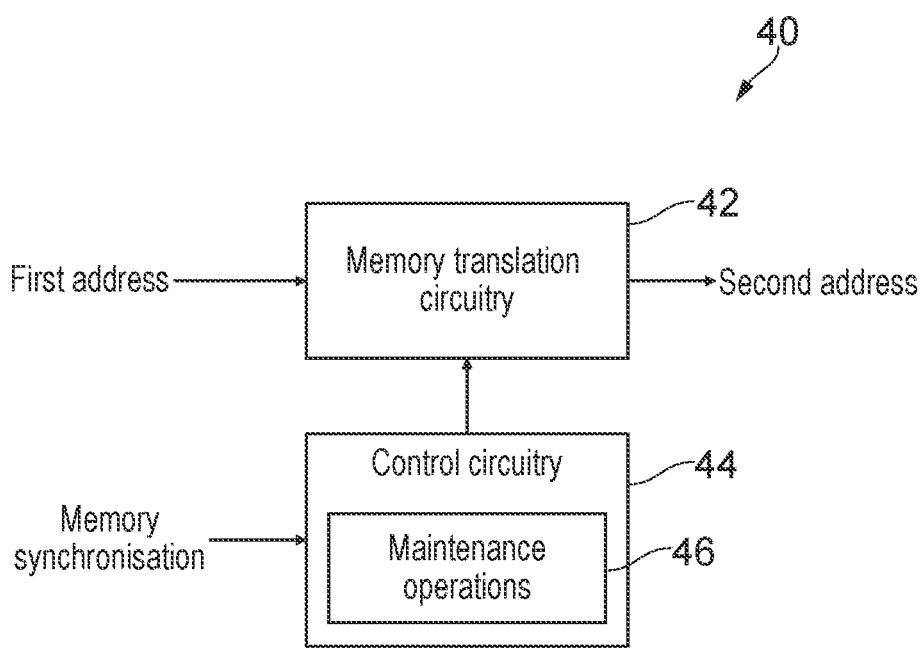
FIG. 2 schematically illustrates an apparatus according to some example configurations of the present techniques.

FIG. 2 schematically illustrates an apparatus 40 according to some configurations of the present techniques. The apparatus 40 is provided with memory translation circuitry 42 and control circuitry 44. The control circuitry 44 is provided with storage circuitry to track one or more maintenance operations 46. The memory translation circuitry 42 is responsive to receipt of a first address in a first address space, for example, a virtual address space, to translate the first address to a second address in a second address space, for example, a physical address space. The memory translation circuitry 42 may be arranged to do this in a variety of ways, for example, by performing a lookup in translation storage circuitry, e.g., a TLB. The memory translation circuitry 42 may also be arranged to trigger a page table walk to perform the translation by performing a sequence of lookups in one or more page tables stored in memory. The control circuitry 44 is responsive to receipt of a memory synchronisation when there are one or more maintenance operations outstanding, to perform a filtering process to identify pending page table walk processes from those of the page table walk process that are affected by the maintenance operation. The filtering process may also identify page table walk processes affected by a completed maintenance operation. The page table walk processes affected by the completed maintenance operation are marked (tagged) so that filtering can be applied subsequent to the completed maintenance operation. The filtering process identifies a set of candidate page table walk processes. The control circuitry 44 is responsive to the identification of the candidate page table walk processes to cancel the candidate page table walk processes to allow the memory synchronisation operation to proceed. Subsequent to the memory synchronisation operation, the control circuitry 44 triggers replay of the cancelled candidate page table walk processes, for example, by the processing circuitry that issued the translation requests or the memory translation circuitry 42.

Figure 3:
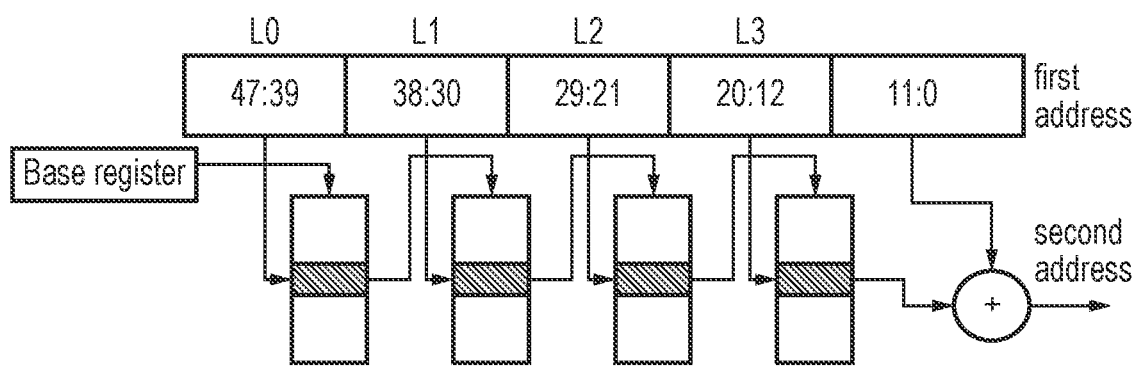
FIG. 3 schematically illustrates a page table walk process according to some configurations of the present techniques.

FIG. 3 schematically illustrates details of an address translation that is carried out by the memory translation circuitry 42 according to various configurations of the present techniques. The memory translation circuitry 42 receives a first address. In the illustrated configuration, the first address comprises 48 bits which includes a sequence of indexing portions (bits 47 down to 39; bits 38 down to 30; bits 29 down to 21; and bits 20 down to 12). Each indexing portion of the sequence of indexing portions corresponds to (is used for) a lookup level of set of sequential lookups. In the illustrated configuration the page table walk comprises four lookups and the first address comprises one indexing portion for each of the lookups. The four lookups are referred to as the Level 0 (L0) lookup, the Level 1 (L1) lookup, the Level 2 (L2) lookup, and the Level 3 (L3) lookup.

Bits 47 down to 39 of the first address are the L0 indexing bits that are used to index into the page table level accessed during the L0 lookup (the sequentially first lookup of the sequence of four lookups). The L0 lookup is performed in a page table level at a page table address (L0 base address) stored in storage circuitry of the memory translation circuitry 42. The lookup performed based on the L0 base address and the L0 indexing bits returns a base address to be used for the sequentially next lookup, the L1 lookup.

Bits 38 down to 30 of the first address are the L1 indexing bits that are used to index into the page table level accessed during the L1 lookup (the sequentially second lookup of the sequence of four lookups). The L1 lookup is performed in a page table level at the base address obtained during the L0 lookup (the L1 base address). The lookup performed based on the L1 base address and the L1 indexing bits returns a base address to be used for the sequentially next lookup, the L2 lookup.

Bits 29 down to 21 of the first address are the L2 indexing bits that are used to index into the page table level accessed during the L2 lookup (the sequentially third lookup of the sequence of four lookups). The L2 lookup is performed in a page table level at the base address obtained during the L1 lookup (L2 base address). The lookup performed based on the L2 base address and the L2 indexing bits returns a base address to be used for the sequentially next lookup, the L3 lookup.

Bits 20 down to 12 of the first address are the L3 indexing bits that are used to index into the page table level accessed during the L3 lookup (the final lookup of the of the four sequential lookups). The L3 lookup is performed in a page table level at the base address obtained during the L2 lookup (L3 base address). The lookup performed based on the L3 base address and the L3 indexing bits returns an address that is combined with the addressing portion (bits 11 down to 0) of the first address to obtain the second address.

It would be readily apparent to the skilled person that the described sequence of lookups is one possible example of a page table walk. The page table walk process may comprise more or fewer lookups in different page tables. Furthermore, the page tables that are accessed during the page table walk may be of different sizes and/or may make use of a different number of bits from the first address.

Figure 4:
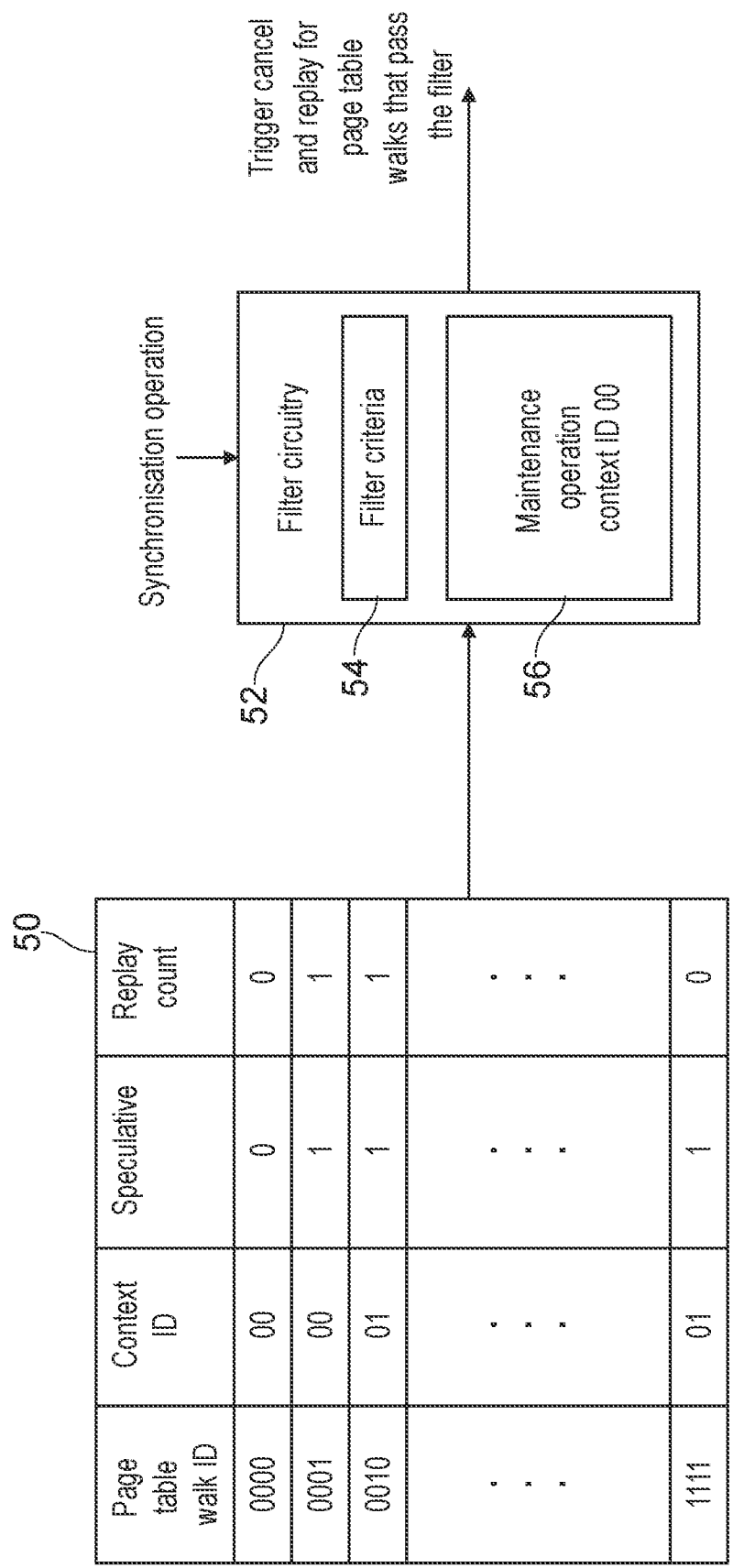
FIG. 4 schematically illustrates an apparatus according to some example configurations of the present techniques.

FIG. 4 schematically illustrates details of a filtering process according to some configurations of the present techniques. The apparatus stores page table walk information 50 identifying pending page table walks. The page table walk information 50 may comprise an identifier for each page table walk, a context identifier indicative of a context of the page table walk, an indication as to whether the page table walk is speculative or whether the page table walk is non-speculative, and replay count information indicative of how many times the page table walk has been replayed. The page table walk information 50 is provided to filter circuitry 52 which comprises information identifying filter criteria 54 and information identifying maintenance operations 56 that have been issued since the last memory synchronisation operation. The information identifying the pending maintenance operation may identify a context identifier of the context that triggered the maintenance operation.

The filter circuitry 52 is responsive to receipt of the synchronisation operation to filter the page tables walks identified in the page table walk information 50 to determine candidate page table walks to be cancelled and replayed subsequent to the synchronisation operation. The filter criteria 54 defines the operation of the filter circuitry 52. For example, the filter criteria may define that the page table walk information 50 is to be filtered such that only page table walks having a common context identifier with the maintenance operations 56 are identified as candidate page table walks. In the illustrated configuration, the maintenance operation identifies context ID 00 and, in this example, the page table walk information identifies page table walks having page table walk ID 0000 and page table walk identifier 0001 as being associated with the same context identifier. These candidate page table walks are therefore cancelled and replayed.

In an alternative example, the filter criteria 54 may require that the filter circuitry 52 selects only speculative page table walks having a common context identifier with the maintenance operations 56 issued since the last memory synchronisation operation as the candidate page table walk processes. In the illustrated configuration, the filter circuitry 52 would therefore select only page table walks 0001 as the candidate page table walk from the page table walk information.

In a further example, the filter circuitry 52 may be configured to only select page table walks that are speculative and for which the replay count is 0 as the candidate page table walks. In the illustrated configuration, the filter circuitry 52 would therefore not select any of the page table walks indicate din the page table walk information 50 to be used as candidate page table walks.

It would be readily apparent to the skilled person that other filter criteria may be based on any combination of the context identifier, the indication as to whether the page table walk is speculative and/or the replay count information. In further configurations, the page table walk information 50 may track one or more further items of data relating to each of the page table walk, for example, whether the page table walk is associated with a prefetch request.

Figure 5:
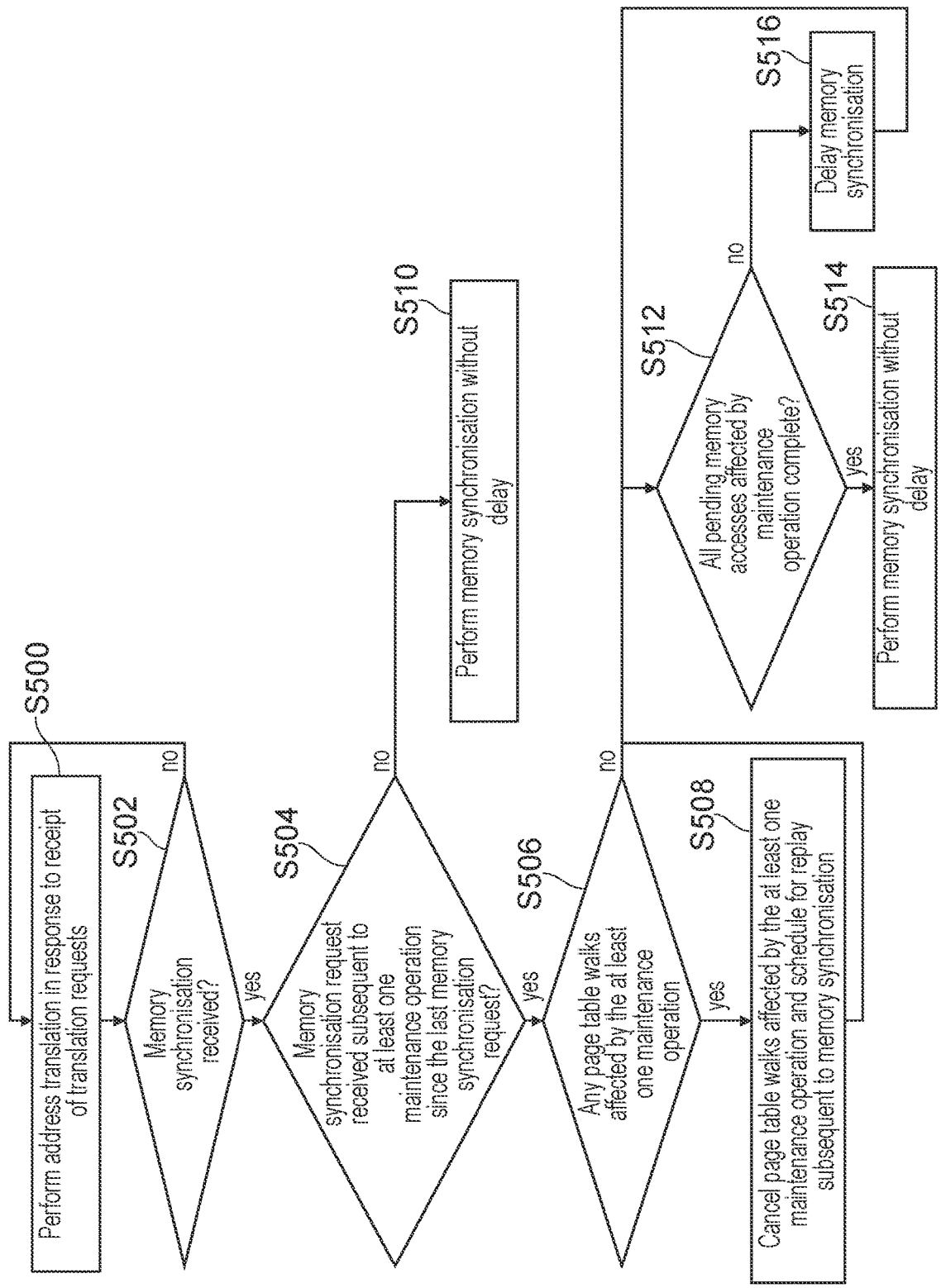
FIG. 5 schematically illustrates a sequence of steps carried out according to some example configurations of the present techniques.

FIG. 5 schematically illustrates a sequence of steps carried out by an apparatus according to some configurations of the present techniques. Flow begins at step S500 where address translations are performed in response to receipt of translation requests. The address translations may include one or more instances of a page table walk process as described in relation to FIG. 3. Flow then proceeds to step S502 where it is determined if a memory synchronisation request has been received. If, at step S502, it is determined that no memory synchronisation request has been received, then flow returns to step S500. If, at step S502, it is determined that a memory synchronisation request has been received, then flow proceeds to step S504. At step S504 it is determined whether the memory synchronisation request has been received subsequent to at least one maintenance operation since the last memory synchronisation request. If, at step S504, it is determined that there have not been any maintenance operations since the last memory synchronisation request, then flow proceeds to step S510 where the memory synchronisation is performed without delay. If, at step S504, it is determined that there has been at least one maintenance operation since the last memory synchronisation request, then flow proceeds to step S506. At step S506 it is determined if any of page table walks (instances of the page table walk process) are affected by the at least one maintenance operation. This is achieved by filtering the page table walks based on a filter criterion, for example, as described in relation to FIG. 4. If, at step S506, it is determined that none of the page table walks are affected by the maintenance operation, then flow proceeds to step S512. If, at step S506, it is determined that there are page table walks that are affected by the at least one maintenance operation, then flow proceeds to step S508. At step S508 the page table walks that are affected by the at least one maintenance operation are cancelled and are scheduled for replay subsequent to the memory synchronisation. Flow then proceeds to step S512. At step S512 it is determined if all pending memory accesses affected by the maintenance operation are complete. If, at step S512, it is determined that there are still outstanding memory accesses affected by the at least one maintenance operation, then flow proceeds to step S516 where the memory synchronisation is delayed before flow returns to step S512. If, at step S512, it is determined that all pending memory accesses affected by the maintenance operation are complete, then flow proceeds to step S514 where the memory synchronisation is performed without further delay.

Figure 6:
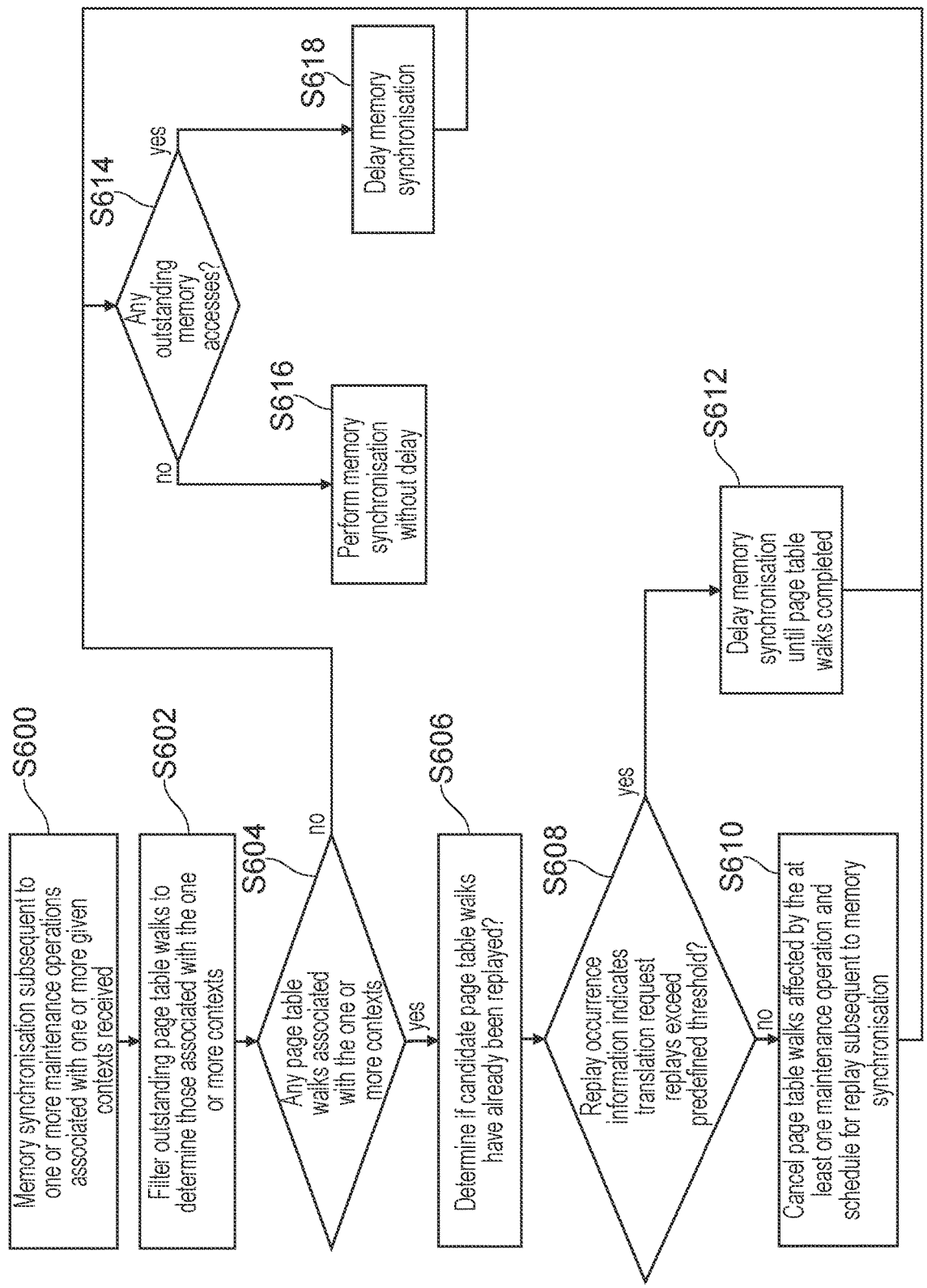
FIG. 6 schematically illustrates a sequence of steps carried out according to some example configurations of the present techniques.

FIG. 6 schematically illustrates a sequence of steps carried out by an apparatus according to some configurations of the present techniques. Flow begins at step S600 where a memory synchronisation subsequent to one or more maintenance operations associated with one or more given contexts is received. Flow then proceeds to step S602 where any outstanding page table walks are filtered to determine those that are associated with the one or more contexts. Flow then proceeds to step S604 where it is determined if there are any page table walks associated with the one or more contexts, i.e., if there were any page table walks that were identified as candidate page table walks by the filtering process. If, at step S604, it is determined that there are no page table walks that were identified as candidate page table walks by the filtering process, then flow proceeds to step S614. If, at step S604, it was determined that there are page table walks that were identified as candidate page table walks by the filtering process, then flow proceeds to step S606 where it is determined if the candidate page table walks have already been replayed. Flow then proceeds to step S608, where it is identified if a replay occurrence information exceeds a predefined threshold. If, at step S608, it is determined that the replay occurrence information exceeds a predefined threshold, then flow proceeds to step S612 where the memory synchronisation is delayed until the candidate page table walks have completed. Flow then proceeds to step S614. If, at step S608, it was determined that there the replay information has not been exceeded, then flow proceeds to step S610 where the candidate page table walks are cancelled and scheduled for replay subsequent to the memory synchronisation. Flow then proceeds to step S614. At step S614 it is determined if there are any outstanding memory accesses. If, at step S614, it is determined that there are outstanding memory accesses then flow proceeds to step S618 where the memory synchronisation is delayed before flow returns to step S614. If at step S614, it is determined that there are no outstanding memory accesses then flow proceeds to step S616 where the memory synchronisation is performed without delay.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 7:
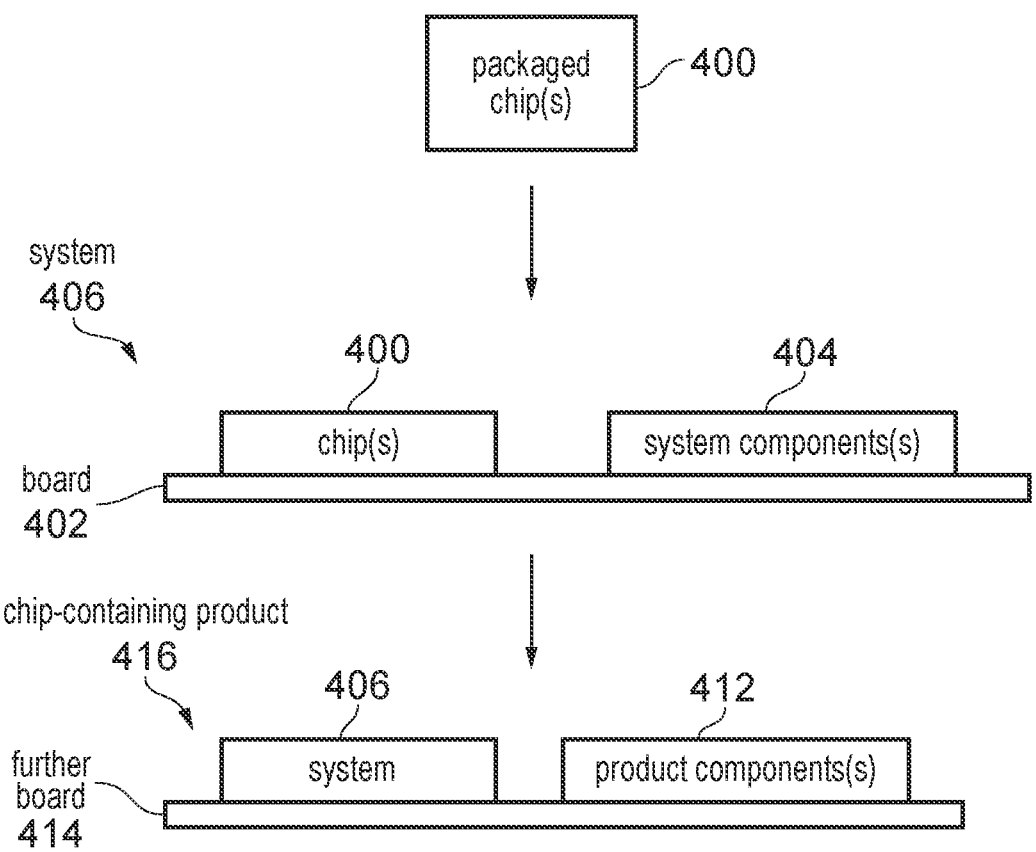
FIG. 7 schematically illustrates a system and chip-containing product according to some example configurations of the present techniques.

As shown in FIG. 7, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL.

Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Concepts described herein may be embodied in an apparatus comprising execution circuitry having one or more vector processing units for performing vector operations on vectors comprising multiple data elements. Execution circuitry having X vector processing units each configured to perform vector operations on Y bit wide vectors, with the respective vector processing units operable in parallel, may be said to have an XxY bit vector datapath. In some embodiments, the execution circuitry is provided having six or more vector processing units. In some embodiments, the execution circuitry is provided having five or fewer vector processing units. In some embodiments, the execution circuitry is provided having two vector processing units (and no more). In some embodiments, the one or more vector processing units are configured to perform vector operations on 128-bit wide vectors. In some embodiments, the execution circuitry has a 2×128 bit vector datapath. Alternatively, in some embodiments the execution circuitry has a 6×128 bit vector datapath.

Concepts described herein may be embodied in an apparatus comprising a level one data (L1D) cache. The L1D cache is a private cache associated with a given processing element (e.g. a central processing unit (CPU) or graphics processing element (GPU)). In a cache hierarchy of multiple caches capable of caching data accessible by load/store operations processed by the given processing element, the L1D cache is a level of cache in the hierarchy which is faster to access than a level two (L2) cache. In some embodiments, the L1 data cache is the fastest to access is the hierarchy, although even faster to access caches, for example, level zero (L0) caches may also be provided. If a load/store operation hits in the L1D cache, it can be serviced with lower latency than if it misses in the L1D cache and is serviced based on data in a subsequent level of cache or in memory. In some embodiments, the L1D cache comprises storage capacity of less than 96 KB, in one example the L1D cache is a 64 KB cache. In some embodiments, the L1D cache comprises storage capacity of greater than or equal to 96 KB, in one example the L1D cache is a 128 KB cache.

Concepts described herein may be embodied in an apparatus comprising a level two (L2) cache. The L2 cache for a given processing element is a level of cache in the cache hierarchy that, among caches capable of holding data accessible to load/store operations, is next fastest to access after the L1D cache. The L2 cache can be looked up in response to a load/store operation missing in the L1D cache or an instruction fetch missing in an L1 instruction cache. In some embodiments, the L2 cache comprises storage capacity of less than 1536 KB (1.5 MB), in one example the L2 cache is a 1024 KB (1 MB) cache. In some embodiments, the L2 cache comprises storage capacity greater than or equal to 1536 KB and less than 2560 KB (2.5 MB), in one example the L2 cache is a 2048 KB (2 MB) cache. In some embodiments, the L2 cache comprises storage capacity greater than or equal to 2560 KB, in one example the L2 cache is a 3072 KB (3 MB) cache. In some embodiments, the L2 cache has a larger storage capacity than the L1D cache.

Figure 8:
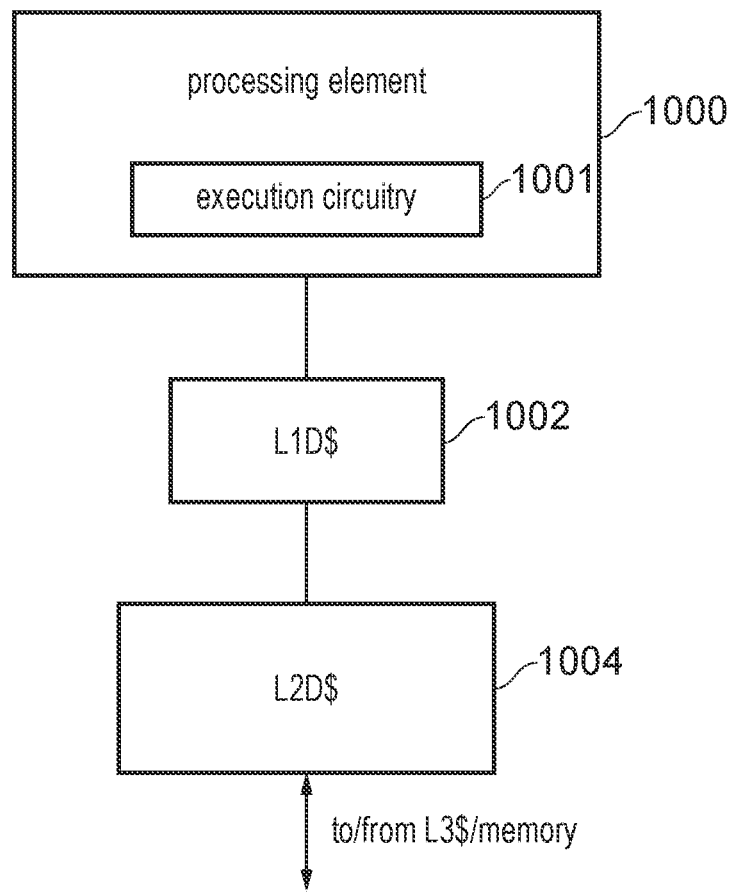
FIG. 8 schematically illustrates a processing element according to some configurations of the present techniques.

FIG. 8 illustrates an example of an apparatus comprising a processing element 1000 (e.g. a CPU or GPU) comprising execution circuitry 1001 for executing processing operations in response to decoded program instructions. The processing element 1000 has access to a L1D cache 1002 and a L2 cache 1004, which are part of a cache hierarchy of multiple caches for caching data from memory that is accessible by the processing element 1000 in response to load/store operations executed by the execution circuitry 1001. The processing element may, for example, be arranged as a processing pipeline 4 indicated in FIG. 1 and may also comprise the memory translation circuitry and control circuitry arranged, for example, as indicated in FIG. 2. The memory translation circuitry may be configured to translate memory addresses indicated in the load/store operations between a first memory address space and a second memory address space as described in relation to FIGS. 1 to 7 above.

Figure 9:
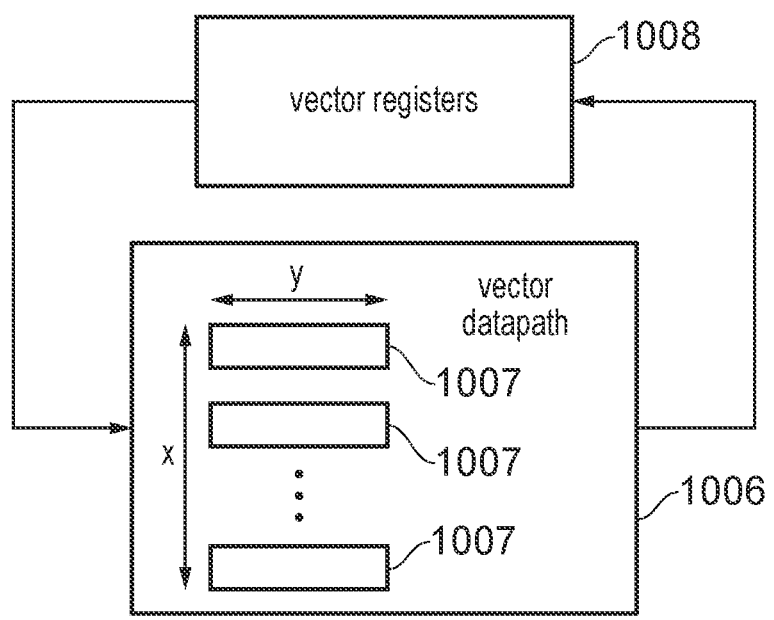
FIG. 9 schematically illustrates a vector datapath according to some configurations of the present techniques.

FIG. 9 illustrates an example of a vector datapath 1006 that may be provided as part of the execution circuitry 1001 of the processing element 1000, and vector registers 1008 for storing vector operands for processing by the vector datapath 1006. Vector operands read from the vector registers 1008 are processed by the vector datapath 1006 to generate vector results which may be written back to the vector registers 1008. The vector datapath 1006 is an X×Y bit vector datapath, comprising X vector processing units 1007 each configured to perform vector operations on Y bit vectors. The vector registers 1008 may be accessible as Z bit vector registers, where Z can be equal to Y or different to Y. For a vector operation requiring a Z-bit vector operand where Z is greater than Y, the Z-bit vector operand can be processed using two or more vector processing units 1007 operating in parallel on different portions of the Z-bit vector operand in the same cycle and/or using multiple passes through the vector datapath in two or more cycles. For vector operations requiring a Z-bit vector operand where Z is less than Y, a given vector processing unit 1007 can process two or more vectors in parallel.

In brief overall summary there is provided an apparatus, a method, and a computer readable storage medium. The apparatus comprises memory translation circuitry responsive to receipt of a translation request specifying a first address, to perform a page table walk process to identify a corresponding second address. The apparatus is also provided with control circuitry responsive to receipt of a memory synchronisation occurring subsequent to at least one maintenance operation, to implement a delay before performing the memory synchronisation. The delay continues whilst one or more pending memory accesses affected by the maintenance operation are outstanding. The control circuitry is configured to perform a filtering process to identify candidate page table walk processes affected by the maintenance operation and, for each candidate page table walk, to cancel the candidate page table walk process and to issue a replayed translation request to trigger a replay of the candidate page table walk process.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Some configurations of the invention may be described by the following numbered clauses:

Clause 1. An apparatus comprising:
memory translation circuitry responsive to receipt of a translation request specifying a first address in a first address space, to perform a page table walk process to identify a corresponding second address in a second address space; and
control circuitry responsive to receipt of a memory synchronisation occurring subsequent to at least one maintenance operation, to implement a delay before performing the memory synchronisation, the delay continuing whilst one or more pending memory accesses affected by the maintenance operation are outstanding,
wherein the control circuitry is configured:
to perform a filtering process to identify candidate page table walk processes affected by the at least one maintenance operation; and
for each candidate page table walk of the candidate page table walk processes, to cancel the candidate page table walk process and, subsequent to the memory synchronisation, to issue a replayed translation request to trigger a replay of the candidate page table walk process.

Clause 2. The apparatus of clause 1, wherein:
the apparatus comprises translation storage circuitry configured to store entries identifying translation data indicative of translations between the first address space and the second address space, the translation data corresponding to at least one stage of the page table walk process;
the memory translation circuitry is responsive to receipt of the first address to perform a lookup of the first address in the translation storage circuitry, and when the lookup hits on an entry in the translation storage circuitry defining a partial translation to perform the page table walk process using the translation data identified in the entry; and
the at least one maintenance operation is an invalidation operation relating to translation storage circuitry.

Clause 3. The apparatus of clause 2, wherein the invalidation operation comprises invalidating one or more of the entries in the translation storage circuitry.

Clause 4. The apparatus of clause 2 or clause 3, wherein the invalidation operation comprises marking a pending page table walk as using invalid translation data to prevent allocation into the translation storage circuitry.

Clause 5. The apparatus of any of clauses 2 to 4, wherein the translation storage circuitry is a translation lookaside buffer and the maintenance operation is a translation lookaside buffer maintenance operation.

Clause 6. The apparatus of any preceding clause, wherein:
the translation request is associated with a requesting context of a plurality of processing contexts;
the at least one maintenance operation is associated with at least one given processing context of the plurality of processing contexts; and
the candidate page table walk processes comprise occurrences of the page table walk process performed in response to a corresponding translation request associated with the at least one given processing context.

Clause 7. The apparatus of clause 6, wherein the control circuitry is responsive to at least a first encoding of the maintenance operation, to identify a single one of the plurality of processing contexts as the at least one given processing context.

Clause 8. The apparatus of clause 6 or clause 7, wherein the at least one given processing context excludes one or more of the plurality of processing contexts.

Clause 9. The apparatus of clause 6 or clause 7, wherein the control circuitry is responsive to at least a second encoding of the maintenance operation, to identify all of the plurality of processing contexts as the at least one given processing context.

Clause 10. The apparatus of any preceding clause, wherein the filtering process comprises identifying occurrences of the page table walk process issued speculatively as the candidate page table walk processes.

Clause 11. The apparatus of any preceding clause, wherein the filtering process comprises identifying occurrences of the page table walk process associated with a prefetch request as the candidate page table walk processes.

Clause 12. The apparatus of any preceding clause, wherein the control circuitry is configured to associate replay occurrence information indicative of a number of times a translation request has been replayed with the replayed translation request; and the filtering process comprises omitting page table walk processes from the candidate page table walk processes when the replay occurrence information associated with the page table walk processes exceeds a predefined threshold.

Clause 13. The apparatus of clause 12, wherein the control circuitry is configured to associate the replay occurrence information only with an oldest non-speculative translation request.

Clause 14. The apparatus of any preceding clause, wherein the predefined threshold is a single replay.

Clause 15. The apparatus of any preceding clause, wherein the page table walk process is a multi-stage page table walk process.

Clause 16. The apparatus of any preceding clause, wherein the first address is a virtual address and the first address space is a virtual address space, and the second address is a physical address and the second address space is a physical address space or an intermediate physical address space.

Clause 17. The apparatus of any preceding clause, comprising execution circuitry comprising a 6×128 bit vector datapath.

Clause 18. A system comprising:
the apparatus of any preceding clause, implemented in at least one packaged chip;
at least one system component; and
a board,
wherein the at least one packaged chip and the at least one system component are assembled on the board.

Clause 19. A chip-containing product comprising the system of clause 18, wherein the system is assembled on a further board with at least one other product component.

Clause 20. A method comprising:
performing in response to receipt of a translation request specifying a first address in a first address space, a page table walk process to identify a corresponding second address in a second address space; and
implementing, in response to receipt of a memory synchronisation occurring subsequent to at least one maintenance operation, a delay before performing the memory synchronisation, the delay continuing whilst one or more pending memory accesses affected by the maintenance operation are outstanding,
performing a filtering process to identify candidate page table walk processes affected by the at least one maintenance operation; and
for each candidate page table walk of the candidate page table walk processes, cancelling the candidate page table walk process and, subsequent to the memory synchronisation, issuing a replayed translation request to trigger a replay of the candidate page table walk process.

Clause 21. A non-transitory computer-readable medium storing computer-readable code for fabrication of the apparatus according to any of clauses 1 to 19.

We claim:

1. An apparatus comprising:
memory translation circuitry responsive to receipt of a translation request specifying a first address in a first address space, to perform a page table walk process to identify a corresponding second address in a second address space; and
control circuitry responsive to receipt of a memory synchronisation occurring subsequent to at least one maintenance operation, to implement a delay before performing the memory synchronisation, the delay continuing while one or more pending memory accesses affected by the maintenance operation are outstanding,
wherein the control circuitry is configured:
to perform a filtering process to identify candidate page table walk processes affected by the at least one maintenance operation; and
for each candidate page table walk of the candidate page table walk processes, to cancel the candidate page table walk process and, subsequent to the memory synchronisation, to issue a replayed translation request to trigger a replay of the candidate page table walk process.

2. The apparatus of claim 1, wherein:
the apparatus comprises translation storage circuitry configured to store entries identifying translation data indicative of translations between the first address space and the second address space, the translation data corresponding to at least one stage of the page table walk process;
the memory translation circuitry is responsive to receipt of the first address to perform a lookup of the first address in the translation storage circuitry, and when the lookup hits on an entry in the translation storage circuitry defining a partial translation to perform the page table walk process using the translation data identified in the entry; and
the at least one maintenance operation is an invalidation operation relating to translation storage circuitry.

3. The apparatus of claim 2, wherein the invalidation operation comprises invalidating one or more of the entries in the translation storage circuitry.

4. The apparatus of claim 2, wherein the invalidation operation comprises marking a pending page table walk as using invalid translation data to prevent allocation into the translation storage circuitry.

5. The apparatus of claim 2, wherein the translation storage circuitry is a translation lookaside buffer and the maintenance operation is a translation lookaside buffer maintenance operation.

6. The apparatus of claim 1, wherein:
the translation request is associated with a requesting context of a plurality of processing contexts;
the at least one maintenance operation is associated with at least one given processing context of the plurality of processing contexts; and
the candidate page table walk processes comprise occurrences of the page table walk process performed in response to a corresponding translation request associated with the at least one given processing context.

7. The apparatus of claim 6, wherein the control circuitry is responsive to at least a first encoding of the maintenance operation, to identify a single one of the plurality of processing contexts as the at least one given processing context.

8. The apparatus of claim 6, wherein the at least one given processing context excludes one or more of the plurality of processing contexts.

9. The apparatus of claim 6, wherein the control circuitry is responsive to at least a second encoding of the maintenance operation, to identify all of the plurality of processing contexts as the at least one given processing context.

10. The apparatus of claim 1, wherein the filtering process comprises at least one of:
identifying occurrences of the page table walk process issued speculatively as the candidate page table walk processes; and
identifying occurrences of the page table walk process associated with a prefetch request as the candidate page table walk processes.

11. The apparatus of claim 1, wherein the control circuitry is configured to associate replay occurrence information indicative of a number of times a translation request has been replayed with the replayed translation request; and
the filtering process comprises omitting page table walk processes from the candidate page table walk processes when the replay occurrence information associated with the page table walk processes exceeds a predefined threshold.

12. The apparatus of claim 11, wherein the control circuitry is configured to associate the replay occurrence information only with an oldest non-speculative translation request.

13. The apparatus of claim 11, wherein the predefined threshold is a single replay.

14. The apparatus of claim 1, wherein the page table walk process is a multi-stage page table walk process.

15. The apparatus of claim 1, wherein the first address is a virtual address and the first address space is a virtual address space, and the second address is a physical address and the second address space is a physical address space or an intermediate physical address space.

16. The apparatus of claim 1, comprising execution circuitry comprising a 6×128 bit vector datapath.

17. A system comprising:
the apparatus of claim 1, implemented in at least one packaged chip;
at least one system component; and
a board,
wherein the at least one packaged chip and the at least one system component are assembled on the board.

18. A chip-containing product comprising the system of claim 17, wherein the system is assembled on a further board with at least one other product component.

19. A method comprising:
performing in response to receipt of a translation request specifying a first address in a first address space, a page table walk process to identify a corresponding second address in a second address space; and
implementing, in response to receipt of a memory synchronisation occurring subsequent to at least one maintenance operation, a delay before performing the memory synchronisation, the delay continuing while one or more pending memory accesses affected by the maintenance operation are outstanding,
performing a filtering process to identify candidate page table walk processes affected by the at least one maintenance operation; and
for each candidate page table walk of the candidate page table walk processes, cancelling the candidate page table walk process and, subsequent to the memory synchronisation, issuing a replayed translation request to trigger a replay of the candidate page table walk process.

20. A non-transitory computer-readable medium storing computer-readable code for fabrication of an apparatus comprising:
memory translation circuitry responsive to receipt of a translation request specifying a first address in a first address space, to perform a page table walk process to identify a corresponding second address in a second address space; and
control circuitry responsive to receipt of a memory synchronisation occurring subsequent to at least one maintenance operation, to implement a delay before performing the memory synchronisation, the delay continuing while one or more pending memory accesses affected by the maintenance operation are outstanding,
wherein the control circuitry is configured:
to perform a filtering process to identify candidate page table walk processes affected by the at least one maintenance operation; and
for each candidate page table walk of the candidate page table walk processes, to cancel the candidate page table walk process and, subsequent to the memory synchronisation, to issue a replayed translation request to trigger a replay of the candidate page table walk process.

* * * * *